US012379240B1

United States Patent
Lydick et al.

(10) Patent No.: US 12,379,240 B1
(45) Date of Patent: Aug. 5, 2025

(54) METHOD AND APPARATUS FOR MEASURING THE WEIGHT OF A CONTAINER USING LOAD CELLS

(71) Applicant: CANALYTICS TECHNOLOGIES, LLC, Aledo, TX (US)

(72) Inventors: Robert Lydick, Fort Worth, TX (US); John Lydick, Houston, TX (US); Roma Montifar, Manvel, TX (US)

(73) Assignee: Canalytics Technologies, LLC, Aledo, TX (US)

( * ) Notice: Subject to any disclaimer, the term of this patent is extended or adjusted under 35 U.S.C. 154(b) by 301 days.

(21) Appl. No.: 17/944,964

(22) Filed: Sep. 14, 2022

Related U.S. Application Data

(60) Provisional application No. 63/245,488, filed on Sep. 17, 2021.

(51) Int. Cl.
| | | |
|---|---|---|
| *G01G 21/24* | (2006.01) | |
| *B30B 9/30* | (2006.01) | |
| *G01G 5/04* | (2006.01) | |
| *G01G 19/393* | (2006.01) | |

(52) U.S. Cl.
CPC ......... *G01G 19/393* (2013.01); *B30B 9/3003* (2013.01); *B30B 9/3042* (2013.01); *G01G 21/24* (2013.01)

(58) Field of Classification Search
CPC ........ G01G 5/04; G01G 5/045; G01G 19/393; G01G 21/24; B30B 9/3003; B30B 9/3042
See application file for complete search history.

(56) References Cited

U.S. PATENT DOCUMENTS

| | | | | |
|---|---|---|---|---|
| 3,752,245 A | * | 8/1973 | Johnson | G01G 5/04 177/208 |
| 4,014,398 A | * | 3/1977 | Gresko | G01G 5/04 177/208 |
| 4,056,156 A | * | 11/1977 | Dayton | G01G 19/44 D10/85 |
| 4,569,407 A | * | 2/1986 | Gray | G01G 3/10 177/208 |
| 5,606,516 A | * | 2/1997 | Douglas | G01G 19/02 177/208 |
| 6,045,155 A | * | 4/2000 | Cech | B60R 21/01516 177/144 |

(Continued)

FOREIGN PATENT DOCUMENTS

| | | |
|---|---|---|
| AU | 2012232994 A1 | 4/2013 |
| CN | 202369033 U | 8/2012 |

(Continued)

OTHER PUBLICATIONS

Futek, Load Cell—Waste Management Load Measurement, Website, Accessed on Oct. 13, 2021.

(Continued)

*Primary Examiner* — Randy W Gibson
(74) *Attorney, Agent, or Firm* — James E. Walton

(57) ABSTRACT

An apparatus for measuring the weight of a container, such as a large trash compactor, includes a base plate and a loading fixture. The loading fixture is carried by the base plate, and includes a floating plate, at least one piston coupled to the floating plate, and a pressure transducer for generating a selected signal based upon pressure in the piston.

7 Claims, 13 Drawing Sheets

(56) References Cited

U.S. PATENT DOCUMENTS

| | | | | |
|---|---|---|---|---|
| 6,919,516 | B2 * | 7/2005 | Frye | G01G 23/3728 |
| | | | | 177/199 |
| 7,145,450 | B2 | 12/2006 | Brown | |
| 7,314,053 | B1 * | 1/2008 | Stalp | G01G 5/04 |
| | | | | 134/113 |
| 8,975,541 | B2 * | 3/2015 | Hornstein | G01G 5/006 |
| | | | | 177/208 |

FOREIGN PATENT DOCUMENTS

| | | |
|---|---|---|
| CN | 210557132 U | 5/2020 |
| CN | 112429445 U | 3/2021 |
| CN | 213120786 U | 5/2021 |
| EP | 1148991 B1 | 12/2003 |
| GB | 1567194 A | 5/1980 |
| JP | 2011178536 A | 9/2011 |

OTHER PUBLICATIONS

Greenwalt, M., U.S. Compactor Monitoring Company Provides 200 Systems to Canadian Waste Partner, www.waste360.com, Apr. 18, 2018.

* cited by examiner

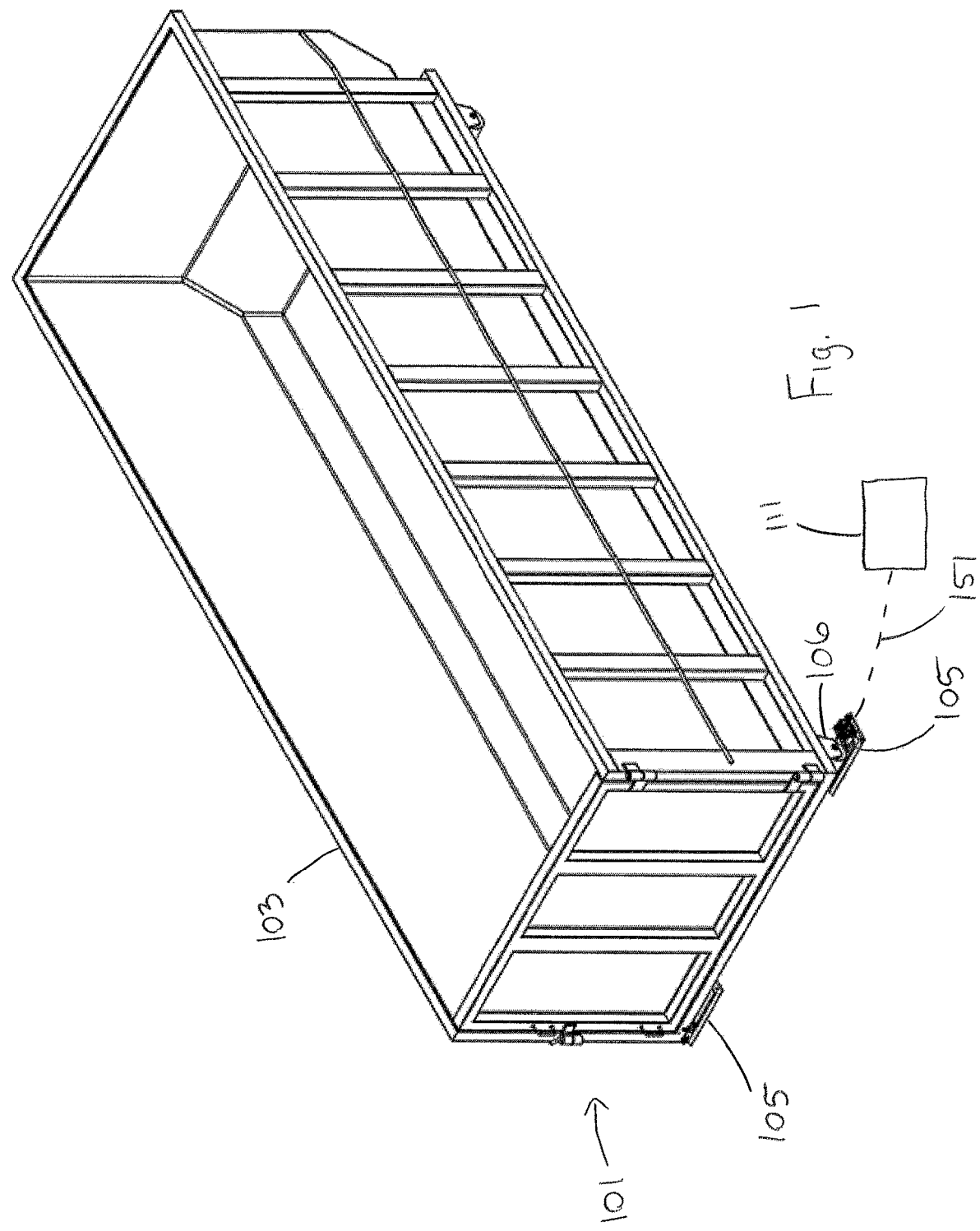

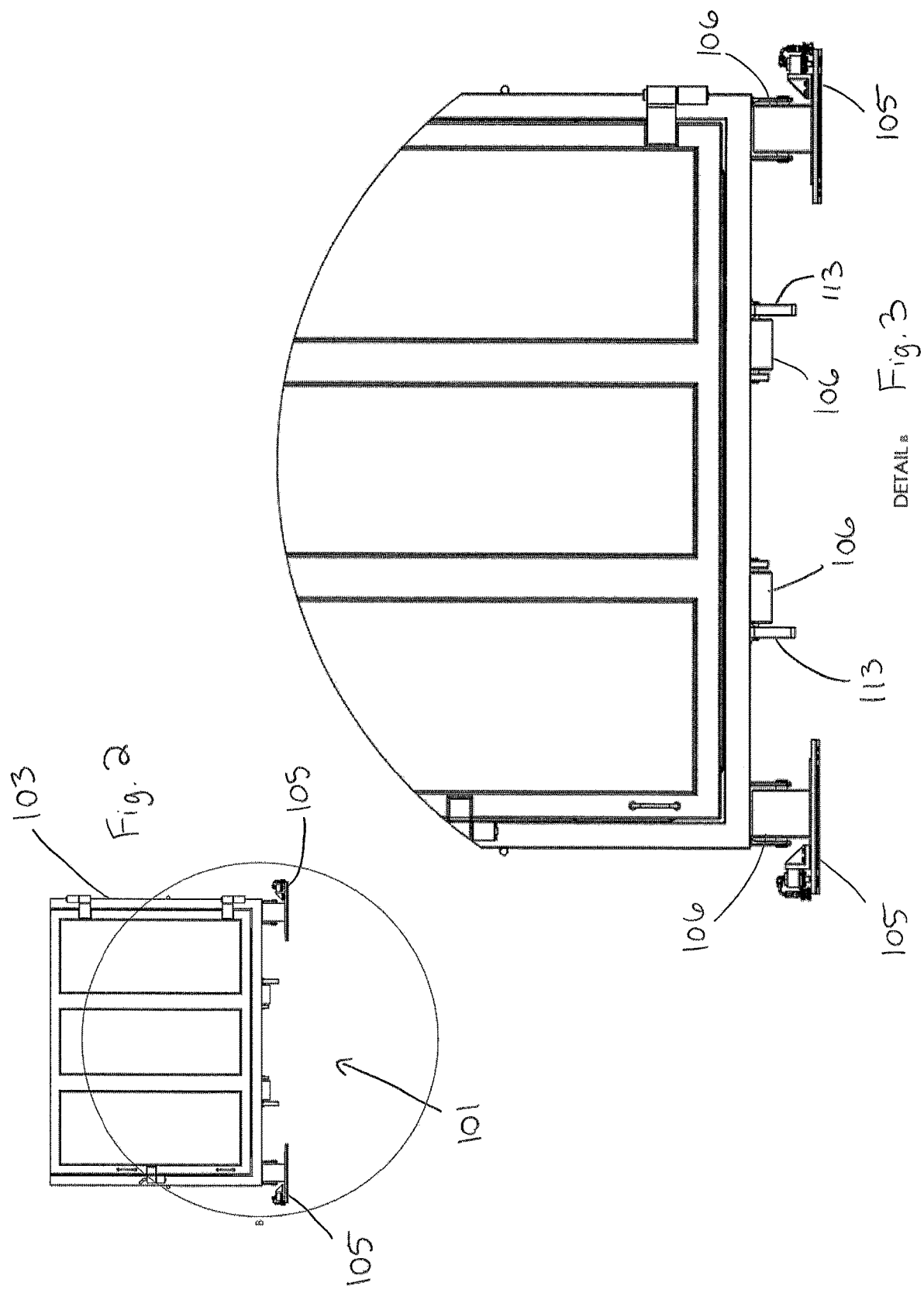

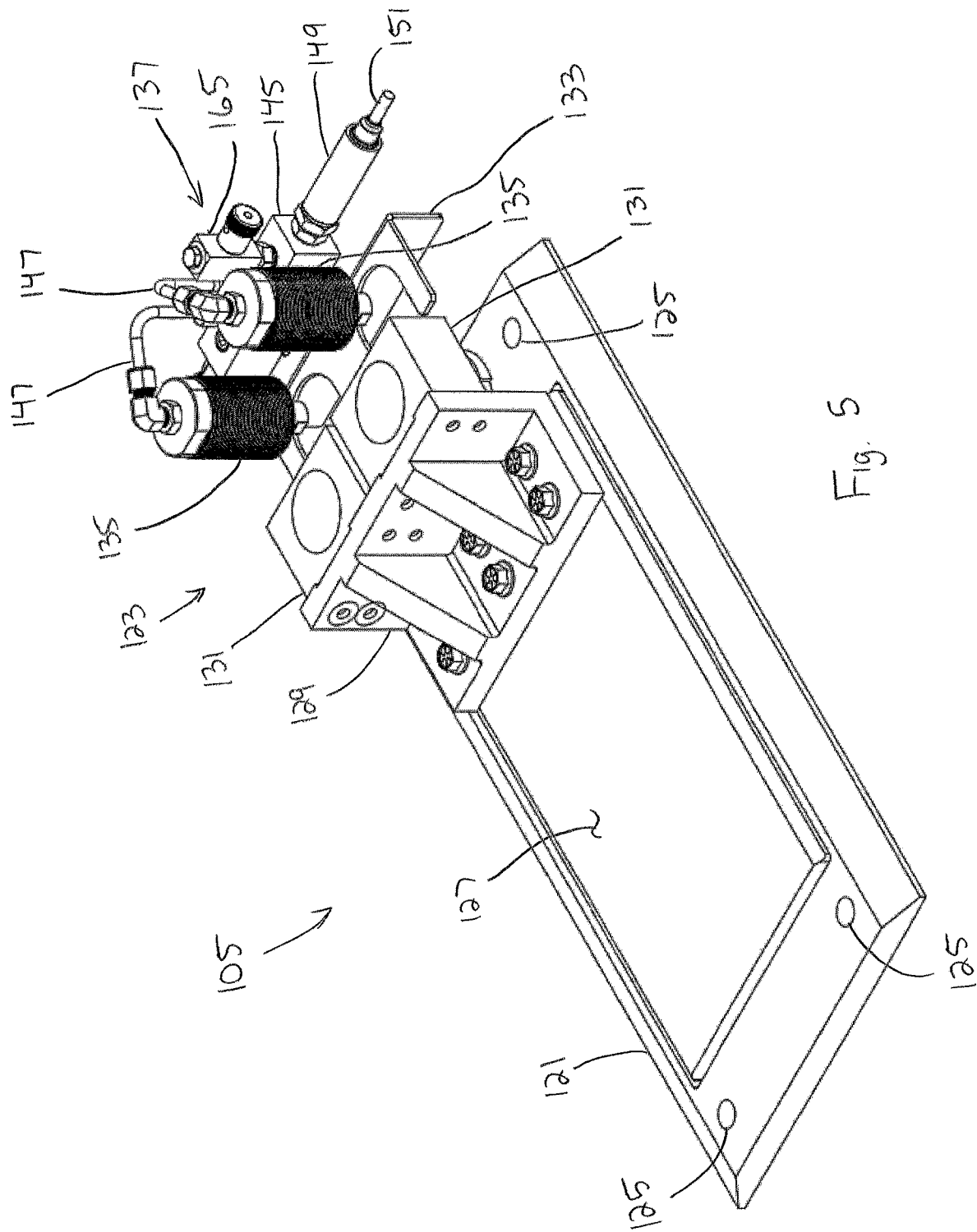

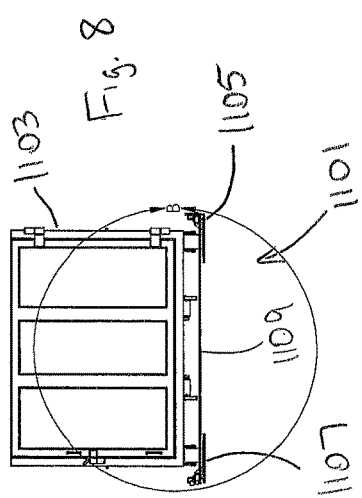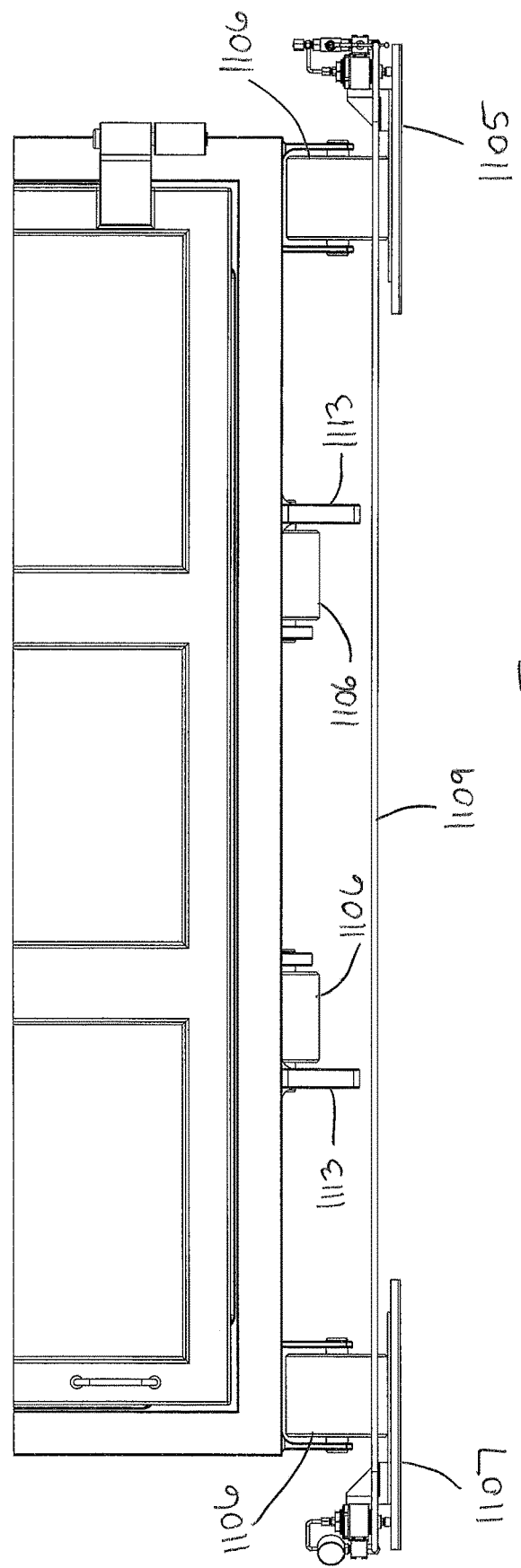

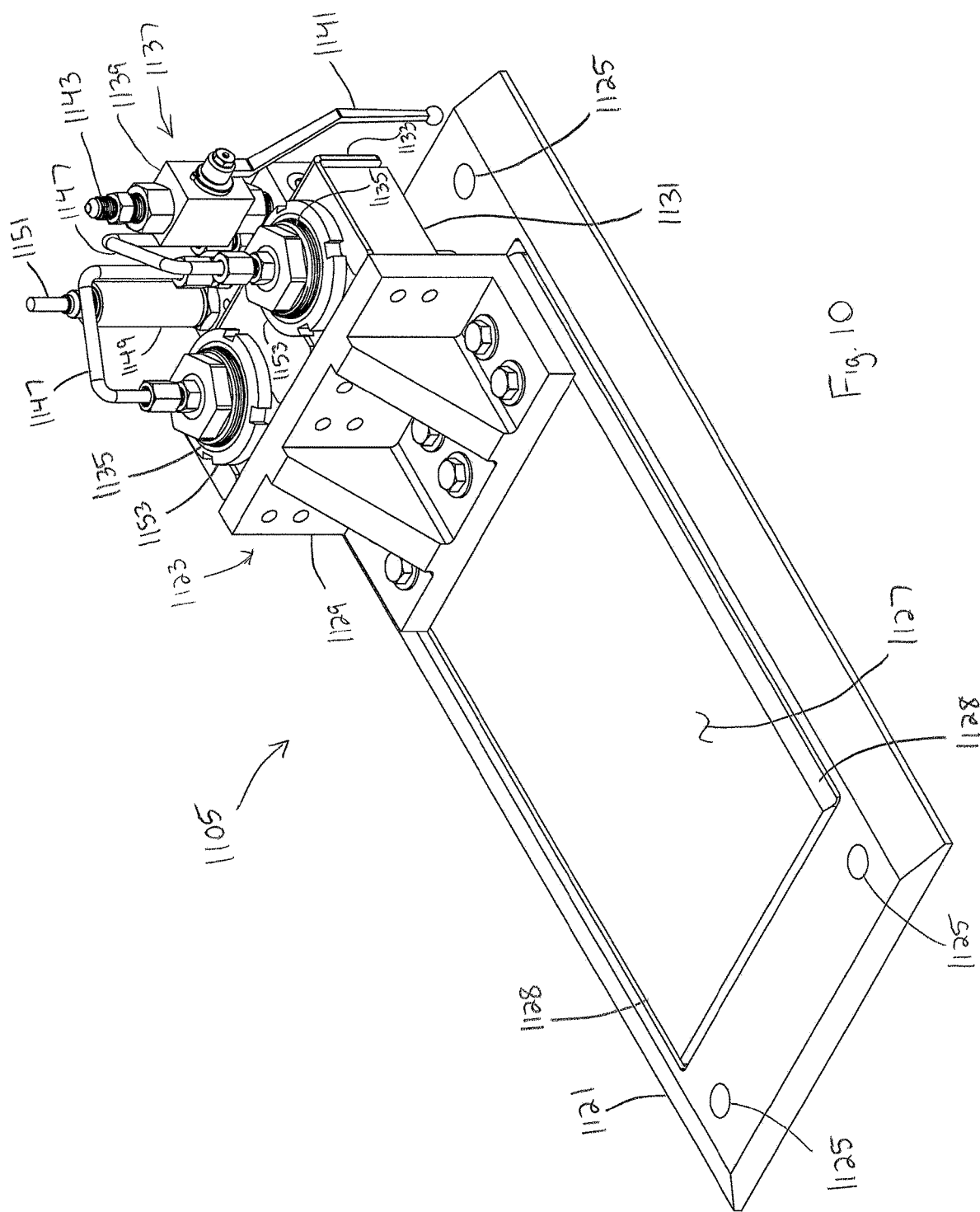

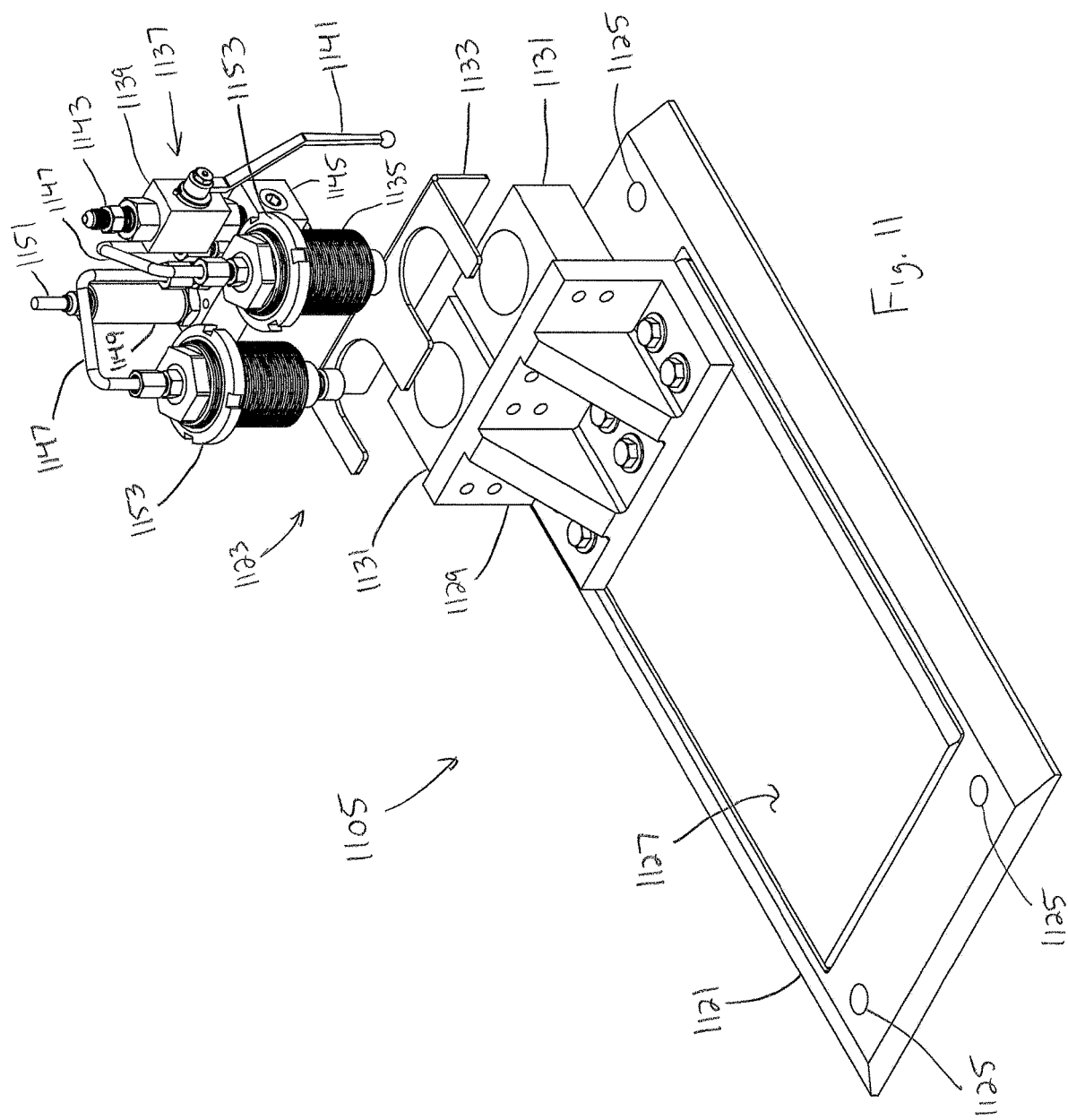

METHOD AND APPARATUS FOR MEASURING THE WEIGHT OF A CONTAINER USING LOAD CELLS

The present application claims the benefit of U.S. Provisional Patent Application No. 63/245,488 filed on 17 Sep. 2021, titled "Method and Apparatus for Measuring the Weight of a Container," which is incorporated herein for all purposes.

BACKGROUND

1. Field of the Present Description

The present application relates to trash compactors, and in particular, to methods and apparatuses for weighing trash compactors and the contents inside trash compactors.

2. Description of Related Art

Various configurations of commercial trash compactors are present in the world today. These trash compactors are large containers with hydraulic rams that compact the trash. These trash compactors are located at particular locations outside of commercial establishments, so that the trash can be collected at a single location. When the container gets full, the hydraulic ram is activated, thereby compacting the trash within the container, so that more trash may be added. When no more trash can be added, the container and/or the entire trash compactor is hauled off and emptied. Once emptied, the container and/or the entire trash compactor is returned to the establishment and placed back in the particular location, so that is can be used again.

It is important that the container be full, but not over the regulatory weight limit for hauling the container to the dump. If the container is not full, then the owner ends up paying for more trips to the dump than necessary. On the other hand, if the container is over-weight, the service company has to remove some of the trash from the container before the container can be hauled to the dump. The excess trash is often left beside the container on the ground. This results in extra clean-up costs to the owner.

Some trash compactors have no means for measuring whether the container is full. As such, they are simply hauled off and emptied either on a schedule or when the owner notices that the trash compactor is full. However, most modern trash compactors have a control system that monitors the status of the trash compactor and notifies the owner and/or a service company when the control system detects that the trash compactor is full. There are several ways that these control systems detect that the trash compactor is full. One way is to measure the pressure on the hydraulic ram. Another way is to measure the amperage of the hydraulic ram. Particular increases in the pressure and/or amperage of the hydraulic ram are generally indicative of the fullness of the container. However, the problem with these systems is that they do not measure the weight of the container.

Some types of trash provide more resistance to the hydraulic ram than others. If the trash provides sufficient resistance to the ram, but the container is not full, it will be emptied too early. On the other hand, if the trash provides less resistance to the ram, the container can get over-weight before the ram detects that the container is full.

Although great strides have been made in the area of trash compactors, considerable shortcomings remain.

BRIEF DESCRIPTION OF THE DRAWINGS

The novel features believed characteristic of the invention are set forth herein. However, the invention itself, as well as a preferred mode of use, and further objectives and advantages thereof, will best be understood by reference to the following detailed description when read in conjunction with the accompanying drawings.

FIG. 1 is a perspective view of an apparatus for measuring the weight of a trash compactor according to a preferred embodiment of the present invention;

FIG. 2 is an end view of the apparatus of FIG. 1;

FIG. 3 is a detailed view of FIG. 2 taken at B;

FIG. 5 is an exploded view of the scale of FIG. 4;

FIG. 8 is an end view of the apparatus of FIG. 7;

FIG. 9 is a detailed view of FIG. 8 taken at B;

FIG. 10 is a perspective view of one of the scales of the apparatus of FIG. 7;

FIG. 11 is an exploded view of the scale of FIG. 10;

FIG. 12A is a perspective view of another one of the scales of the apparatus of FIG. 7;

DETAILED DESCRIPTION OF THE PREFERRED EMBODIMENT

Figure 4:
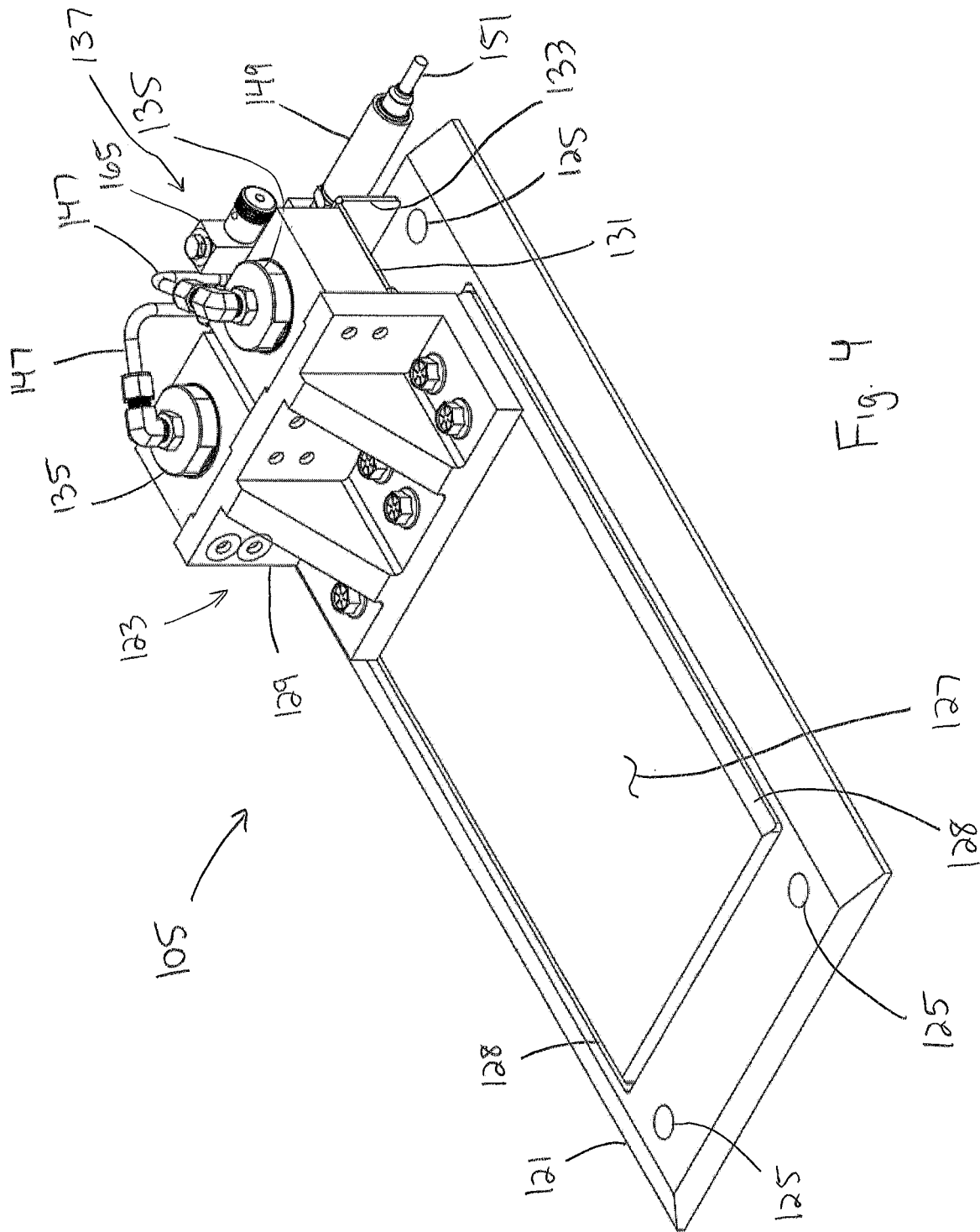
FIG. 4 is a perspective view of one of the scales of the apparatus of FIG. 1.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application.

When directions, such as upper, lower, top, bottom, clockwise, counter-clockwise, are discussed in this disclosure, such directions are meant to only supply reference directions for the illustrated figures and for orientation of components in respect to each other or to illustrate the figures. The directions should not be read to imply actual directions used in any resulting embodiment or actual use. Under no circumstances, should such directions be read to limit or impart any meaning into the present application.

Referring now to FIG. 1 in the drawings, a preferred embodiment of an apparatus 101 for measuring the weight of a large container 103 is illustrated. Although container 103 has been shown as a dumpster, in the preferred embodiment, container 103 is a large commercial trash compactor, such as the type of trash compactor located outside commercial buildings for storing and compacting trash and/or recyclables. Such trash compactors typically include a hopper section that is fixed to a building or structure, a hydraulic ram section for compacting the trash, and a trash container section that may be separated and hauled off to be emptied. The trash container section typically has a closed top and an open end. Once emptied, the trash container section is returned to location and reconnected to the hopper section and/or the hydraulic ram section, so that more trash may be loaded and compacted. Container 103 typically includes one or more wheels or casters 106 that aid in loading container 103 onto a truck for hauling container 103 to a dump. In some containers 103, casters 106 may be replaced by skids or feet. Thus, container 103 is configured to be loaded onto a truck or trailer and hauled away to be emptied. Once container 103 is emptied, it is returned and placed back into position, so that it can be filled again.

Apparatus 101 preferably includes one more scales 105, along with a control system 111, to aid in determining the weight of container 103. Scales 105 are preferably individual standalone units installed on the ground beneath casters 106, such that at least part of the weight of container 103 is transferred to scale 105. Preferably, scales 105 are each capable of measuring readings individually. However, it should be appreciated that scales 105 may be interconnected, such that the readings are pieced together to provide one set of output data. As shown in the embodiment of FIG. 1, only two scales 105 are utilized. Scales 105 have been located at the same end of container 103. In this configuration, control system 111 is connected to one of the scales 105 via a signal cable 151 (see FIGS. 4 and 5) and is programmed with a selected algorithm to extrapolate the entire weight of container 103 by using the loads generated on scale 105. In those embodiments in which container 103 is a trash compactor, it is preferred that scales 105 be located on the end of the trash compactor near the hopper section and hydraulic ram section. This ensures that casters 106 are properly placed on scales 105.

Of course, more scales could be utilized if desired, such as one on each corner of container 103. In such cases, control system 111 and the algorithm would simply be adjusted to calculate the weight of container 103 based upon load data from each scale. However, the use of two scales 105 is advantageous, because it is often difficult for the driver of the hauling truck to accurately place four casters 106 of container 103 on four separate scales. It will be appreciated that any combination of scales may be interconnected, and that the data from any combination of scales may be extrapolated and/or manipulated by control system 111.

In the preferred embodiment, scales 105 are standalone units, not being physically interconnected. However, it should be appreciated that alternative embodiments may include scales 105 in fluid communication, such that a hydraulic fluid passes between scales 105 via a hydraulic hose or conduit. Scales 105 may also be electrically interconnected, so that data, signals, and other electrical information may be transmitted and received between scales and control system 111. Control system 111 controls apparatus 101 and facilitates the transmission and receipt of data, signals, and other information to and from users via computer networks, cellular networks, and other communication networks. Control system 111 is preferably located at least partially inside the building at which the container is located. The use and control of apparatus 101 will be discussed further below.

Referring now also to FIGS. 2 and 3 in the drawings, apparatus 101 is illustrated in more detail. FIG. 2 is an end view of apparatus 101 and container 103, and FIG. 3 is an enlarged view of FIG. 2. Container 103 may include one or more rails 113 to guide container 103 as container 103 is being loaded and unloaded.

Figure 6A:
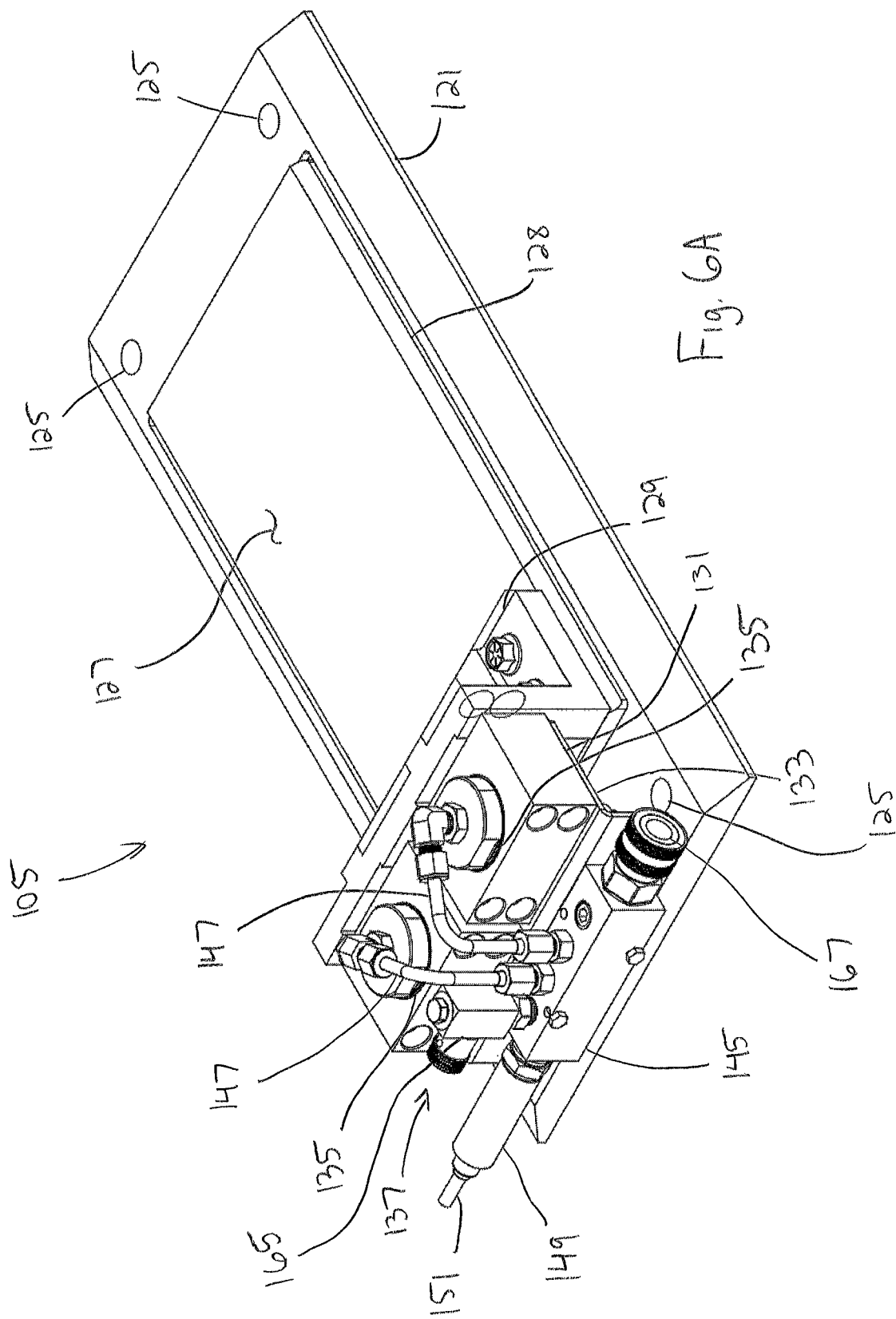
FIG. 6A is a rear perspective view of one of the scales of the apparatus of FIG. 1.
Figure 6B:
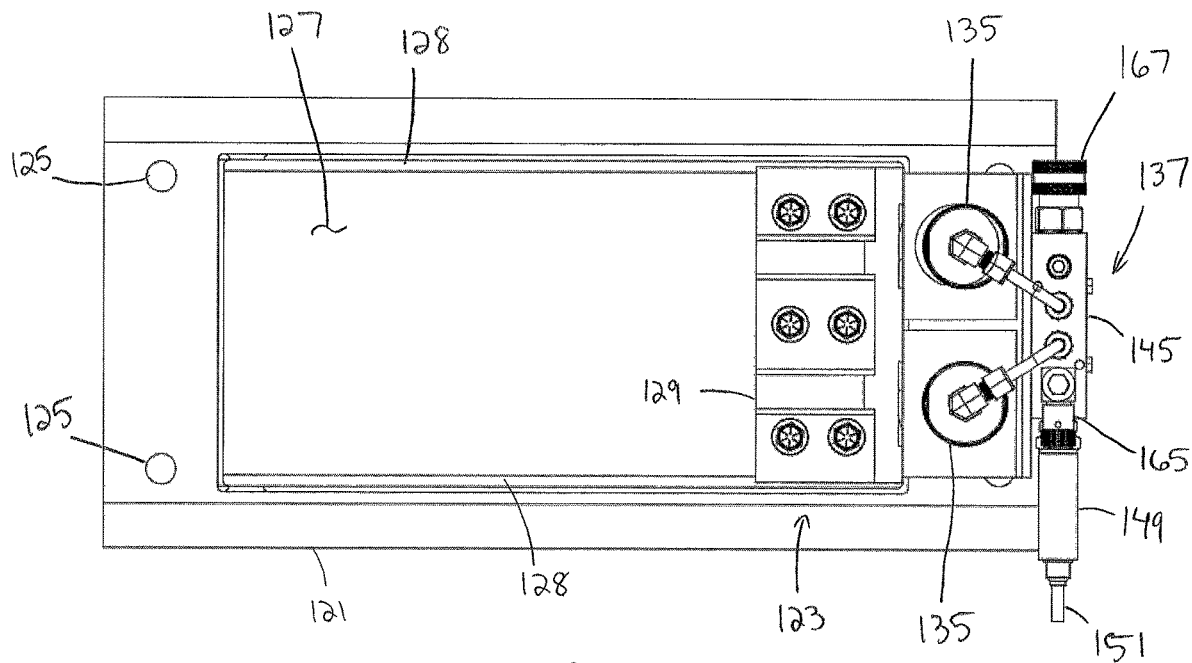
FIG. 6B is a top view of the scale of FIG. 6A.
Figure 6C:
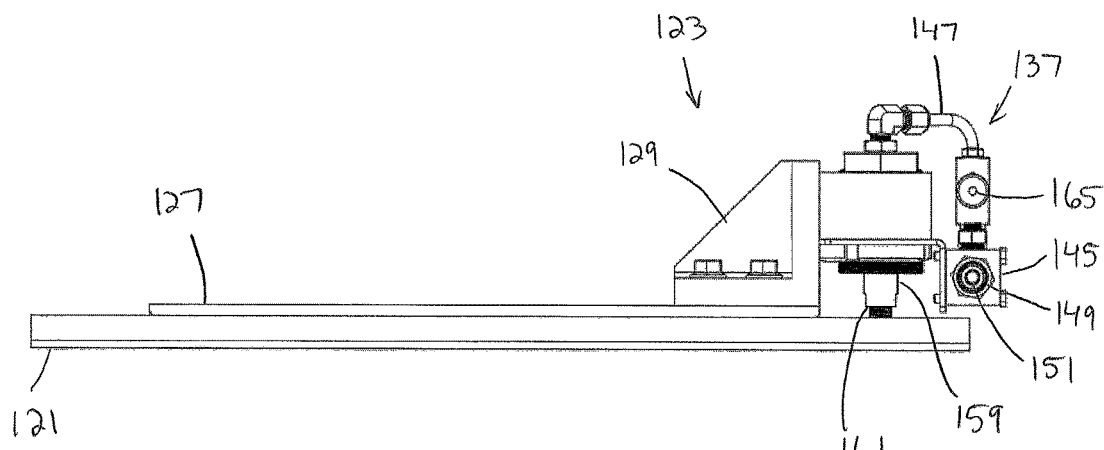
FIG. 6C is a side view of the scale of FIG. 6A.

Referring now also to FIGS. 4-6C in the drawings, scale 105 is illustrated in detail. FIG. 4 shows a front perspective view of scale 105, while FIG. 5 shows an exploded view from the same perspective as FIG. 4. FIGS. 6A, 6B, and 6C show a rear perspective view, top view and side view of scale 105, respectively. Scale 105 includes a base plate 121 and a loading fixture 123. Base plate is preferably a steel plate about ¾" thick, and includes apertures 125 for anchoring base plate 121 to the ground or another structure. Loading fixture 123 includes a floating plate 127, a loading bracket 129 coupled to floating plate 127, one or more piston blocks 131 coupled to bracket 129, a support plate 133 coupled to piston blocks 131, one or more pistons 135 threadingly carried by piston blocks 131, and a fluid distribution system 137 coupled to pistons 135. Floating plate 127 is preferably made of steel and has chamfered edges 128 at least along the length thereof.

Fluid distribution system 137 includes a manifold 145, one or more tubes 147 for connecting manifold 145 to hydraulic pistons 135, one or more pressure transducers 149, one or more signal cables 151 for connecting pressure transducer 149 to control system 111, port 165, and a quick-disconnect port 167. Preferably, port 165 is an air-purge needle-valve port with a knob for additional flow control to assist in the filling process. Quick-disconnect port 167 is preferably configured with female connection portion, such that when a compatible male connection portion is disconnected, the flow is stopped. It should be appreciated that alternative methods of a quick disconnect, that do not use a male/female connection, may be integrated into alternative embodiments of the present invention. It will be appreciated that the components of fluid distribution system 137 may be enclosed in a protective housing. In addition, various components of loading fixture 123 may be integrally formed together. For example, bracket 129 and piston blocks 131 may be formed of a single piece of material.

Loading bracket 129 functions to position pistons 135. Pistons 135 are preferably hydraulic pistons, but may be any other type of piston or actuator. Pistons 135 preferably include external threads that are received by internal threads on piston blocks 131. Pistons 135 may be secured in place using a mechanism such as a locking nut. In this embodiment, loading fixture 123 includes two pistons 135 to better distribute the load from floating plate 127.

As best seen in FIG. 6C, each piston 135 includes a piston ram 159 that moves up and down, which is coupled to a piston pad 161 that rests on base plate 121. With this configuration, loading fixture 123 is supported at one end by floating plate 127 and on the other end by piston pads 161. Floating plate 127 preferably rests on an internal ledge 163 (Not shown) of base plate 121. Floating plate 127 is configured to flex slightly along the length thereof. It should be appreciated that alternative embodiments of the present invention may vary the plating configurations, while maintaining the overall configuration of the present invention.

When casters 106 of container 103 are placed on floating plates 127 of scales 105, a portion of the weight of container 103 is transferred to piston pads 161 causing a pressure to be exerted on pistons 135. Fluid distribution systems 137 then distribute and equalize the pressure in pistons 135. Pressure transducer 149 then converts the pressure into either current or voltage and sends an appropriate signal over signal cable 151 to control system 111.

There are at least two methods by which control system 111 can determine the weight of container 103. First, control system 111 can calculate the total weight of container 103 at any given moment via the algorithm, which would extrapolate the total weight of container 103 from the partial weight of container 103 resting on scales 105. Second, control system 111 can keep a running total of the total weight of container 103, again, via the algorithm, each time more trash is added to container 103. Control system 111 can perform these calculations automatically and continuously.

In turn, control system 111 transmits selected data to a server or other communications device, where the data is monitored. In the preferred embodiment, the server will have preset parameters for the amount of weight capable of being stored. When those parameters are matched by the data being transmitted from control system 111, an alert can be programmed. For example, when a trash compactor reaches a certain weight, the alert can be generated and sent to one or more selected waste management companies, notifying them to empty container 103.

This unique configuration of apparatus 101 provides weight data, rather than volume. The issue with using volume as the only measurement is that sometimes heavy particles cause container 103 be over an acceptable weight, while still not being full in volume. As a result, waste must be emptied from container 103 before container 103 can be transported to a waste management facility. This results in a very inefficient process of waste management. The unique configuration of the present application allows for cleaner and more efficient trash removal processes.

Figure 7:
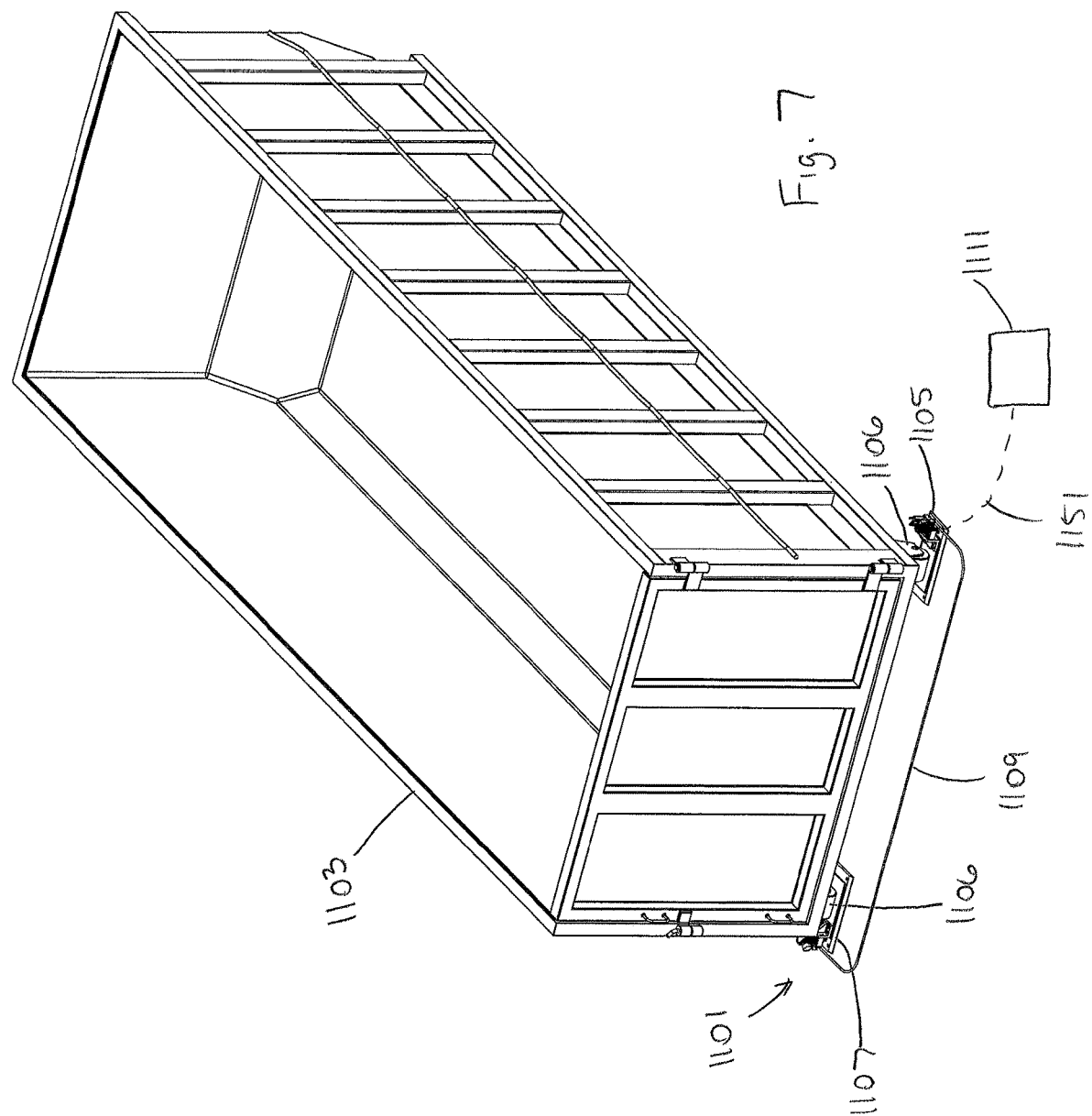
FIG. 7 is a perspective view of an apparatus for measuring the weight of a trash compactor according to an alternative embodiment of the present invention.
Figure 13A:
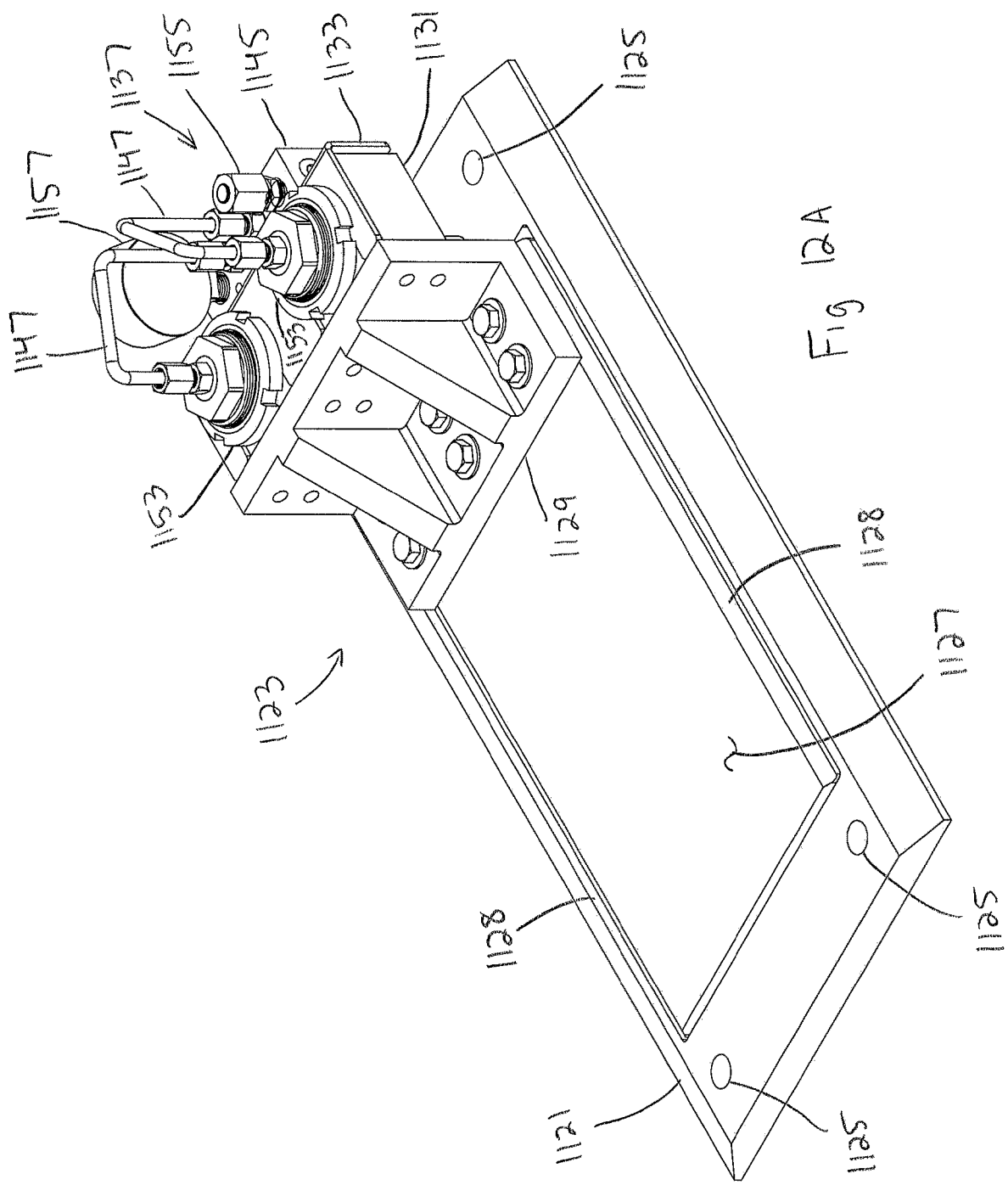

Referring now also to FIG. 7 in the drawings, an alternative embodiment of an apparatus 1101 for measuring the weight of a large container 1103 is illustrated. Although container 1103 has been shown as a dumpster, in the embodiment of FIG. 7, container 1103 is a large commercial trash compactor, such as the type of trash compactor located outside commercial buildings for storing and compacting trash and/or recyclables. Such trash compactors typically include a hopper section that is fixed to a building or structure, a hydraulic ram section for compacting the trash, and a trash container section that may be separated and hauled off to be emptied. The trash container section typically has a closed top and an open end. Once emptied, the trash container section is returned to location and reconnected to the hopper section and/or the hydraulic ram section, so that more trash may be loaded and compacted. Container 1103 typically includes one or more wheels or casters 1106 that aid in loading container 1103 onto a truck for hauling container 1103 to a dump. In some containers 1103, casters 1106 may be replaced by skids or feet. Thus, container 1103 is configured to be loaded onto a truck or trailer and hauled away to be emptied. Once container 1103 is emptied, it is returned and placed back into position, so that it can be filled again.

Apparatus 1101 preferably includes one more scales 1105 and 1107, along with a control system 1111, to aid in determining the weight of container 1103. Scales 1105 and 1107 are preferably interconnected and installed on the ground beneath casters 1106, so that at least part of the weight of container 1103 is transferred to scales 1105 and 1107. As shown in the embodiment of FIG. 7, only two scales 1105 and 1107 are utilized. Scales 1105 and 1107 have been located at the same end of container 1103. In this configuration, control system 1111 is connected to scales 1105 and 1107 via a signal cable 1151 (see FIGS. 10 and 11) and is programmed with a selected algorithm to extrapolate the entire weight of container 1103 by using the loads generated on scales 1105 and 1107. In those embodiments in which container 1103 is a trash compactor, it is preferred that scales 1105 and 1107 be located on the end of the trash compactor near the hopper section and hydraulic ram section. This ensures that casters 1106 are properly placed on scales 1105 and 1107.

Of course, more scales could be utilized if desired, such as one on each corner of container 1103. In such cases, control system 1111 and the algorithm would simply be adjusted to calculate the weight of container 1103 based upon load data from each scale. However, the use of two scales 1105 and 1107 is advantageous, because it is often difficult for the driver of the hauling truck to accurately place four casters 1106 of container 1103 on four separate scales. It will be appreciated that any combination of scales may be interconnected, and that the data from any combination of scales may be extrapolated and/or manipulated by control system 1111.

In the preferred embodiment, scales 1105 and 1107 are in fluid communication, such that a hydraulic fluid passes between scales 1105 and 1107 via a hydraulic hose or conduit 1109. Scales 1105 and 1107 may also be electrically interconnected, so that data, signals, and other electrical information may be transmitted and received between scales and control system 1111. Control system 1111 controls apparatus 1101 and facilitates the transmission and receipt of data, signals, and other information to and from users via computer networks, cellular networks, and other communication networks. Control system 1111 is preferably located at least partially inside the building at which the container is located. The use and control of apparatus 1101 will be discussed further below.

Referring now also to FIGS. 8 and 9 in the drawings, apparatus 1101 is illustrated in more detail. FIG. 8 is an end view of apparatus 1101 and container 1103, and FIG. 9 is an enlarged view of FIG. 8. Container 1103 may include one or more rails 1113 to guide container 1103 as container 1103 is being loaded and unloaded. Scale 1105 is an "upstream" scale, and scale 1107 is a "downstream" scale, in that after scales 1105 and 1107 have been installed, hydraulic fluid is loaded into scale 1105 and then flows into scale 1107 via hose 1109.

Referring now also to FIGS. 10 and 11 in the drawings, scale 1105 is illustrated in detail. Scale 1105 includes a base plate 1121 and a loading fixture 1123. Base plate is preferably a steel plate about ¾" thick, and includes apertures 1125 for anchoring base plate 1121 to the ground or another structure. Loading fixture 1123 includes a floating plate 1127, a loading bracket 1129 coupled to floating plate 1127, one or more piston blocks 1131 coupled to bracket 1129, a support plate 1133 coupled to piston blocks 1131, one or more pistons 1135 threadingly carried by piston blocks 1131, and a fluid distribution system 1137 coupled to pistons 1135. Floating plate 1127 is preferably made of steel and has chamfered edges 1128 at least along the length thereof.

Fluid distribution system 1137 includes a fluid input valve 1139, a valve handle 1141, a filling port 1143, a manifold 1145, one or more tubes 1147 for connecting manifold 1145 to hydraulic pistons 1135, one or more pressure transducers 1149, and one or more signal cables 1151 for connecting pressure transducer 1149 to control system 1111. It will be appreciated that the components of fluid distribution system 1137 may be enclosed in a protective housing. In addition, various components of loading fixture 1123 may be integrally formed together. For example, bracket 1129 and piston blocks 1131 may be formed of a single piece of material.

Loading bracket 1129 functions to position pistons 1135. Pistons 1135 are preferably hydraulic pistons, but may be any other type of piston or actuator. Pistons 1135 preferably include external threads that are received by internal threads on piston blocks 1131. Pistons 1135 are secured in place by locking nuts 1153. In this embodiment, loading fixture 1123 includes two pistons 1135 to better distribute the load from floating plate 1127.

Referring now also to FIGS. 12A-12D in the drawings, scale 1107 is illustrated in detail. As with scale 1105, scale 1107 includes a base plate 1121 and a loading fixture 1123. Base plate is preferably a steel plate about ¾" thick, and includes apertures 1125 for anchoring base plate 1121 to the ground or another structure. Loading fixture 1123 includes a floating plate 1127, a loading bracket 1129 coupled to floating plate 1127, one or more piston blocks 1131 coupled to bracket 1129, a support plate 1133 coupled to piston blocks 1131, one or more pistons 1135 threadingly carried by piston blocks 1131, and a fluid distribution system 1137 coupled to pistons 1135. Floating plate 1127 is preferably made of steel and has chamfered edges 1128 at least along the length thereof.

Fluid distribution system 1137 includes one or more air purge valves 1155, a manifold 1145, one or more tubes 1147 for connecting manifold 1145 to hydraulic pistons 1135, one or more pressure gages 1157, and one or more couplings 1159 for connecting scale 1107 to scale 1105. Air purge valves 1155 assist in the filling process. It will be appreciated that the components of fluid distribution system 1137 may be enclosed in a protective housing. In addition, various components of loading fixture 1123 may be integrally formed together. For example, bracket 1129 and piston blocks 1131 may be formed of a single piece of material. Pressure gages 1157 display the pressure within fluid distribution systems 1137, so that maintenance personnel can know that it is safe to repair and/or maintain apparatus 1101. Pressure transducers 1149 determine the pressure within fluid distribution system 1137 of scale 1107 and/or scale 1105.

Loading bracket 1129 functions to position pistons 1135. Pistons 1135 are preferably hydraulic pistons, but may be any other type of piston or actuator. Pistons 1135 preferably include external threads that are received by internal threads on piston blocks 1131. Pistons 1135 are secured in place by locking nuts 1153. In this embodiment, loading fixture 1123 includes two pistons 1135 to better distribute the load from floating plate 1127.

Figure 12B:
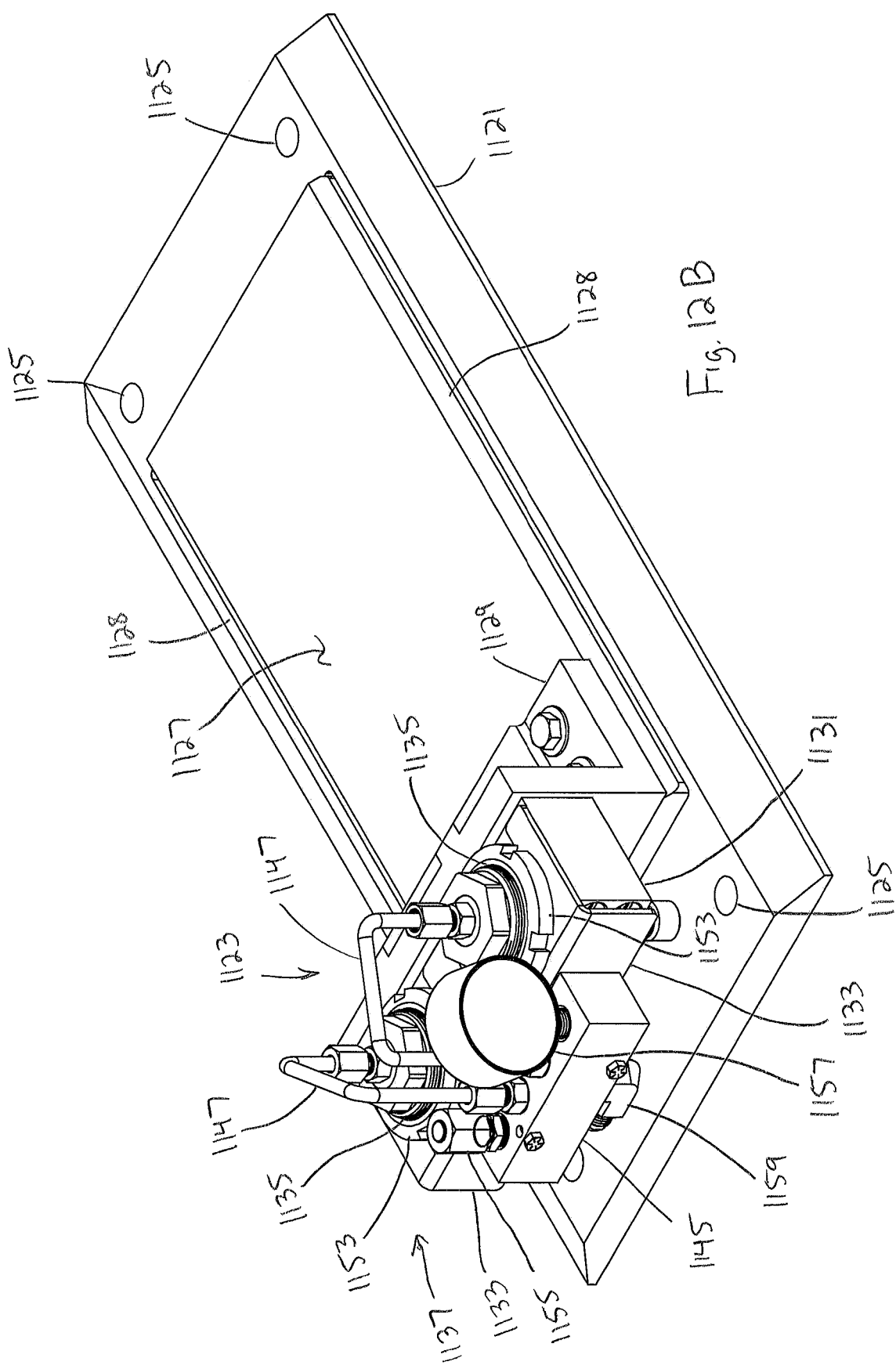
FIG. 12B is a rear perspective view of the scale of FIG. 12A.
Figure 12C:
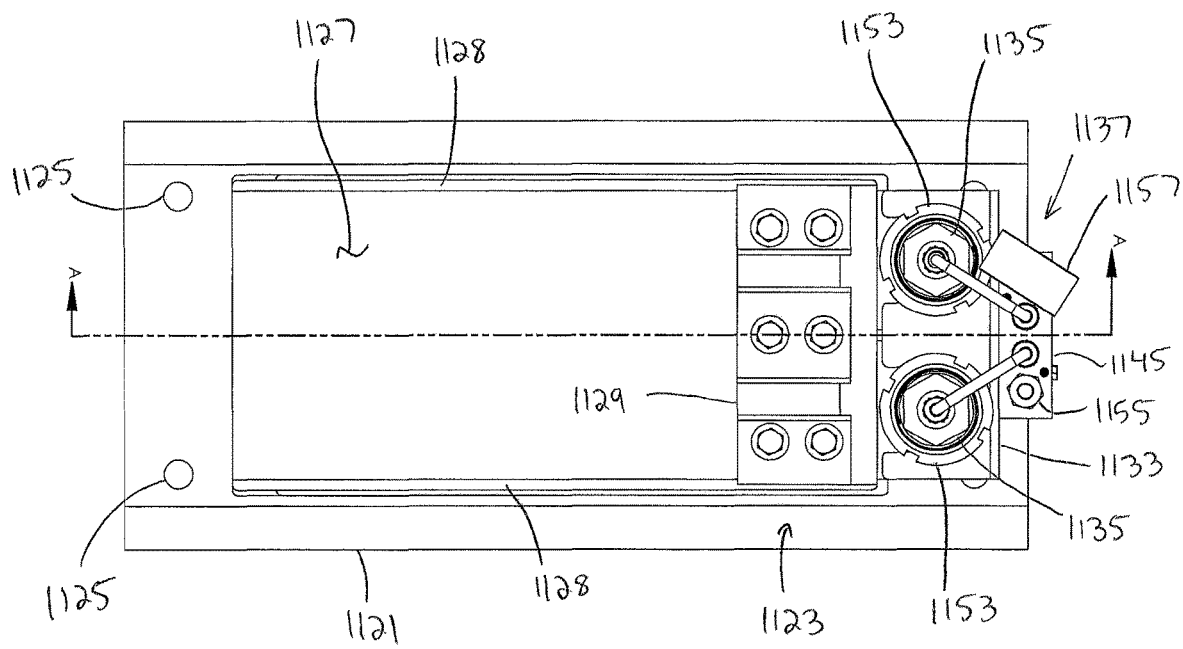
FIG. 12C is a top view of the scale of FIG. 12A.
Figure 12D:
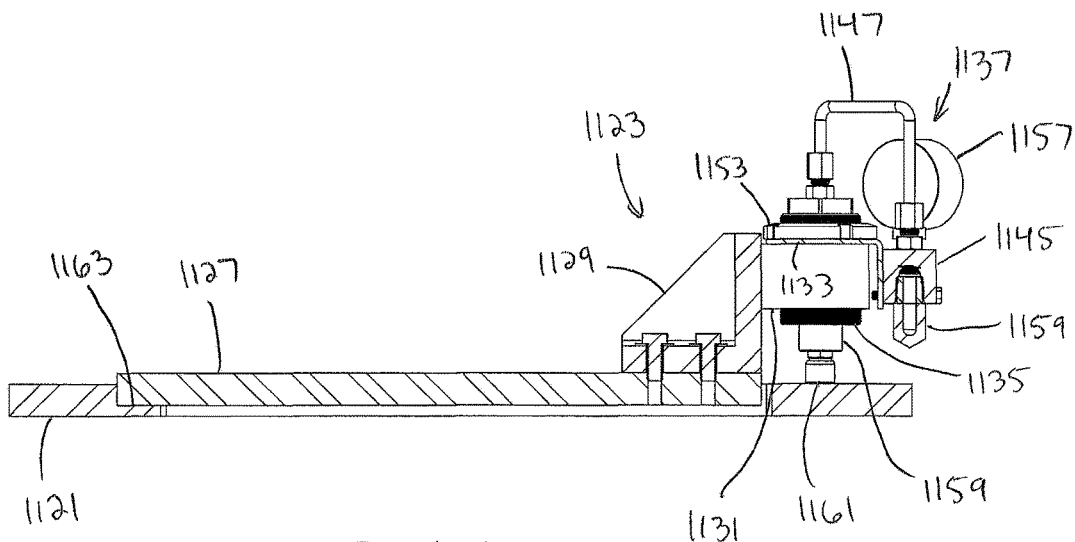
FIG. 12D is a cross-sectional view of the scale of FIG. 12C taken at A-A of FIG. 12C.

As best seen in FIG. 12D, each piston 1135 includes a piston ram 1159 that moves up and down, which is coupled to a piston pad 1161 that rests on base plate 1121. With this configuration, loading fixture 1123 is supported at one end by floating plate 1127 and on the other end by piston pads 1161. Floating plate 1127 rests on an internal ledge 1163 of base plate 1121. Floating plate 1127 is configured to flex slightly along the length thereof.

When casters 1106 of container 1103 are placed on floating plates 1127 of scales 1105 and 1107, a portion of the weight of container 1103 is transferred to piston pads 1161 causing a pressure to be exerted on pistons 1135. Fluid distribution systems 1137 then distribute and equalize the pressure in pistons 1135. Pressure transducer 149 then converts the pressure into either current or voltage and sends an appropriate signal over signal cable 1151 to control system 1111.

There are at least two methods by which control system 1111 can determine the weight of container 1103. First, control system 1111 can calculate the total weight of container 1103 at any given moment via the algorithm, which would extrapolate the total weight of container 1103 from the partial weight of container 1103 resting on scales 1105 and 1107. Second, control system 1111 can keep a running total of the total weight of container 1103, again, via the algorithm, each time more trash is added to container 1103. Control system 1111 can perform these calculations automatically and continuously.

In turn, control system 1111 transmits selected data to a server or other communications device, where the data is monitored. In the preferred embodiment, the server will have preset parameters for the amount of weight capable of being stored. When those parameters are matched by the data being transmitted from control system 1111, an alert can be programmed. For example, when a trash compactor reaches a certain weight, the alert can be generated and sent to one or more selected waste management companies, notifying them to empty container 1103.

This unique configuration of apparatus 1101 provides weight data, rather than volume. The issue with using volume as the only measurement is that sometimes heavy particles cause container 1103 be over an acceptable weight, while still not being full in volume. As a result, waste must be emptied from container 1103 before container 1103 can be transported to a waste management facility. This results in a very inefficient process of waste management. The unique configuration of the present application allows for cleaner and more efficient trash removal processes.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A scale device for measuring the weight of a container, the apparatus comprising:
    a base plate; and
    a loading fixture carried by the base plate, the loading fixture comprising:
        a floating plate;
        at least one piston coupled to a side of the floating plate;
        a piston ram coupled to the at least one piston, the piston ram being configured to move as pressure is applied;
        a piston pad coupled to the base plate, the piston pad being further coupled to the piston ram such that, when an object is placed on the floating plate, a portion of the object's weight is transferred to the piston pad and pressure is exerted on the piston ram; and
        a pressure transducer for generating a selected signal based upon pressure in the piston.

2. The scale device of claim 1, further comprising:
    an electronic device configured for sending signals to an external receiver.

3. The scale device of claim 2, wherein the electronic device is a wireless device.

4. The scale device of claim 2, wherein the electronic device is a wired device.

5. The scale device of claim 1, further comprising:
    a purging port coupled to the loading fixture, the purging port having a needle-valve access point, the port being configured for flow control of the scale device.

6. The scale device of claim 1, further comprising:
a disconnect port coupled to the loading fixture, the disconnect port being configured to operably shut off the scale device operation when the port is disengaged.
7. The scale device of claim 1, further comprising:
a housing coupled to the loading fixture, the housing configured for protection of at least a portion of the at least one piston or the pressure transducer.

\* \* \* \* \*